United States Patent
Ohkoshi et al.

(10) Patent No.: US 8,444,872 B2
(45) Date of Patent: *May 21, 2013

(54) MAGNETIC IRON OXIDE PARTICLE, MAGNETIC MATERIAL, AND RADIO WAVE ABSORBER

(75) Inventors: Shin-ichi Ohkoshi, Tokyo (JP); Shunsuke Sakurai, Tokyo (JP); Takenori Yorinaga, Tokyo (JP); Kazuyuki Matsumoto, Tokyo (JP); Shinya Sasaki, Tokyo (JP)

(73) Assignees: The University of Tokyo, Tokyo (JP); Dowa Electronics Materials Co., Ltd., Tokyo (JP)

( * ) Notice: Subject to any disclaimer, the term of this patent is extended or adjusted under 35 U.S.C. 154(b) by 633 days.

This patent is subject to a terminal disclaimer.

(21) Appl. No.: 12/451,731

(22) PCT Filed: May 30, 2008

(86) PCT No.: PCT/JP2008/059976
§ 371 (c)(1),
(2), (4) Date: Mar. 18, 2010

(87) PCT Pub. No.: WO2008/149785
PCT Pub. Date: Dec. 11, 2008

(65) Prior Publication Data
US 2010/0171066 A1    Jul. 8, 2010

(30) Foreign Application Priority Data

May 31, 2007 (JP) .................................. 2007-146182
Oct. 3, 2007 (JP) .................................. 2007-260071

(51) Int. Cl.
H01F 1/00 (2006.01)
H01F 1/37 (2006.01)
C01G 51/00 (2006.01)
C01G 49/00 (2006.01)

(52) U.S. Cl.
USPC .................. 252/62.56; 252/62.64; 252/62.62; 252/62.63; 252/62.54; 252/62.53; 252/62.57; 252/62.58; 252/62.59

(58) Field of Classification Search
USPC .......... 252/62.54, 62.53, 52.56, 62.65–62.64, 252/62.57–62.59, 62.62, 62.63
See application file for complete search history.

(56) References Cited

U.S. PATENT DOCUMENTS 5,552,073 A    9/1996    Tomiku et al.
2009/0261919 A1*    10/2009    Takeda et al. .................. 333/1.1

FOREIGN PATENT DOCUMENTS

| DE | 30 41 960 A1 | 5/1981 |
|---|---|---|
| EP | 1 101 736 A1 | 5/2001 |
| EP | 1 279 651 A2 | 1/2003 |
| EP | 1 650 177 A1 | 4/2006 |
| EP | 1 675 134 A2 | 6/2006 |
| JP | A-02-167810 | 6/1990 |
| JP | A-2006-096907 | 4/2006 |
| JP | A-2006-224954 | 8/2006 |
| JP | A-2006-234958 | 9/2006 |
| JP | 2008-63199 * | 3/2008 |
| JP | 2008-63200 * | 3/2008 |
| JP | 2008-63201 * | 3/2008 |
| JP | A-2008-063199 | 3/2008 |
| JP | A-2008-063200 | 3/2008 |
| JP | A-2008-063201 | 3/2008 |
| JP | A-2008-100871 | 5/2008 |
| JP | A-2008-174405 | 7/2008 |

OTHER PUBLICATIONS

Supplementary European Search Report in European Patent Application No. 08764894.5; dated Dec. 2, 2011.
Kuroki et al., "$\epsilon$-In$_x$Fe$_{2-x}$O$_3$ Nanorod no Kagakuteki Gosei to Sono Kyojisei—Hankyojisei Ten'i," 86$^{th}$ Annual Meeting on Chemical Society of Japan in Spring, 2006, p. 511.
International Search Report issued in International Application No. PCT/JP2008/059976 on Oct. 14, 2008 (with English-language translation).
Jin et al., "Giant Coercive Field of Nanometer-Sized Iron Oxide," Advanced Materials, vol. 16, No. 1, Jan. 2004, pp. 48-51.

* cited by examiner

*Primary Examiner* — Carol M Koslow
(74) *Attorney, Agent, or Firm* — Oliff & Berridge, PLC (57) ABSTRACT

Disclosed is a magnetic material having high Hc and High Curie point, which is capable of controlling such magnetic characteristics without requiring rare or expensive raw materials. Specifically disclosed is a magnetic material composed of particles of a magnetic iron oxide which is represented by the following general formula: $\epsilon$-A$_x$B$_y$Fe$_{2-x-y}$O$_3$ or $\epsilon$-A$_x$B$_y$C$_z$Fe$_{2-x-y-z}$O$_3$ (wherein A, B and C each represents a metal excluding Fe and different from each other, satisfying 0<x, y, z<1), with $\epsilon$-Fe$_2$O$_3$ as a main phase.

17 Claims, 7 Drawing Sheets

MAGNETIC IRON OXIDE PARTICLE, MAGNETIC MATERIAL, AND RADIO WAVE ABSORBER

TECHNICAL FIELD

The present invention relates to a magnetic iron oxide particle that can be applied to a high density magnetic recording medium and a radio wave absorber, and relates to a magnetic material and a radio wave absorber using this magnetic iron oxide particle.

DESCRIPTION OF RELATED ART

In a magnetic recording field, a magnetic recording medium with a so-called high C/N ratio has been developed, which is capable of improving an output while reducing a particulate-related noise. In order to satisfy such a characteristic of high C/N ratio, a coercive force of a medium has been developed and a magnetic powder particle constituting a magnetic layer has been made further finer. Moreover, in order to maintain a recording state, environment-resistant stability is also an important subject, wherein the magnetic recording medium is unaffected by a magnetization state due to an external environment.

In the magnetic recording medium, a recording bit needs to be made small, to achieve high density recording. Further, a ferromagnetic state also needs to be maintained, in a normal environment in which the magnetic recording medium is exposed during a process of preservation and usage, and for example under a condition of a room temperature. Particularly, magnetization stability to heat is considered to be proportional to a magnetic anisotropic constant and a particle volume. Here, the magnetic anisotropic constant is considered to be increased by increasing the coercive force of the magnetic recording medium. Accordingly, in order to obtain a particle with small particle volume and high heat stability, it is considered that a substance with high coercive force is effective for a use as a magnetic material.

Based on the aforementioned consideration, inventors of the present invention found $\epsilon\text{-Fe}_2\text{O}_3$, being a nanoparticle, as a material exhibiting a giant coercive force of 20 kOe under the condition of a room temperature, and disclosed it in non-patent document 1. Further, it is found that the coercive force can be controlled by replacing a part of a Fe site of this $\epsilon\text{-Fe}_2\text{O}_3$, with trivalent ion different from Fe, and this knowledge is disclosed in patent documents 1 to 3.

Non patent document 1: Jian Jin, Shinichi Ohkoshi and Kazuhito Hashimoto ADVANCED MATERIALS 2004, 16, No. 1 January 5 pp. 48-51
Patent document 1:
  Japanese Patent Application No. 2006-096907
Patent document 2:
  Japanese Patent Application No. 2006-224954
Patent document 3:
  Japanese Patent Application No. 2006-234958

DISCLOSURE OF THE INVENTION

Problem to be Solved by the Invention

The $\epsilon\text{-Fe}_2\text{O}_3$ disclosed in the non-patent document 1 by the inventors of the present invention is a substance having a giant coercive force of a 20 kOe level. However, for the magnetic recording to use a magnetic particle having such a giant coercive force, it is necessary to generate a high magnetic field by using a magnetic head having a saturation magnetic flux density of a higher level, to thereby write information. However, there is absolutely no material to satisfy such a request among materials known as head materials at present, and therefore it is considered that such a magnetic particle is hardly applied to a magnetic recording medium.

Meanwhile, when a technical field of the magnetic recording is focused, there is a heat assist magnetic recording method capable of writing information by temporarily reducing the coercive force by an action of an external laser. However, this recording method is a matter for examination at present, because problems are involved therein to be solved for practical application.

Here, as disclosed in the patent documents 1 to 3 by the inventors of the present invention, it ca-n be considered that the coercive force can be reduced to a desired value, if using $\epsilon\text{-Fe}_2\text{O}_3$ obtained by replacing a part of the Fe site with trivalent metal. However, after detailed examination, it is found that there is a problem that heat resistant property is low in such a trivalent element replacement type $\epsilon\text{-Fe}_2\text{O}_3$, and it is problematic from a viewpoint of stably maintaining the magnetic recording for a long time.

Therefore, in order to solve the above-described technical problems, an object of the present invention is to provide magnetic powders having high heat stability, while arbitrarily adjusting the coercive force.

Means to be Solved by the Invention

The inventors of the present invention achieves a point that magnetic powders having high heat stability can be obtained while arbitrarily adjusting the coercive force, provided that a part of a Fe3+ ion site in $\epsilon\text{-Fe}_2\text{O}_3$ is replaced with mutually different two or three kinds of metal elements.

Namely, a first invention for solving the problems is a magnetic iron oxide particle, with $\epsilon\text{-Fe}_2\text{O}_3$ as a main phase, which is expressed by a general formula $\epsilon\text{-A}_x\text{B}_y\text{Fe}_{2-x-y}\text{O}_3$ (wherein A and B are mutually different metals excluding Fe, satisfying 0<x, y<1).

A second invention is a magnetic iron oxide particle, with $\epsilon\text{-Fe}_2\text{O}_3$ as a main phase, which is expressed by a general formula $\epsilon\text{-A}_x\text{B}_y\text{C}_z\text{Fe}_{2-x-y-z}\text{O}_3$ (wherein A B and C are mutually different metals excluding Fe, satisfying 0<x, y, z<1).

A third invention is the magnetic iron oxide particle according to the first or second invention, wherein A is bivalent metal, B is quadrivalent metal, and C is trivalent metal.

A fourth invention is the magnetic iron oxide particle according to any one of the first to third inventions, wherein A is one or more kinds of metals selected from Co, Ni, Mn, and Zn.

A fifth invention is the magnetic iron oxide particle according to any one of the first to fourth inventions, wherein B is Ti.

A sixth invention is the magnetic iron oxide particle according to any one of the second to fifth inventions, wherein C is one or more kinds of metals selected from In, Ga, and Al.

A seventh invention is the magnetic iron oxide particle according to any one of the first to sixth inventions, wherein a longest length of the magnetic iron oxide particle is 5 nm or more and 120 nm or less.

An eighth invention is the magnetic iron oxide particle according to any one of the first to seventh inventions, wherein a coercive force Hc is 39.8 kA/m or more and 1194.3 kA/m or less.

A ninth invention is the magnetic iron oxide particle according to any one of the first to eighth inventions, wherein saturation magnetization σs at 25° C. is 0.1 Am²/kg or more and 100 Am²/kg or less.

A tenth invention is a magnetic material containing the magnetic iron oxide particle of any one of the first to ninth inventions, and a binder.

An eleventh invention is a radio wave absorber, with the magnetic iron oxide particle of any one of the first to ninth inventions dispersed in rubber or resin.

ADVANTAGES OF THE INVENTION

The magnetic iron oxide particles according to the present invention are excellent in heat stability, and a coercive force can be arbitrarily controlled, by replacing a part of a $Fe^{3+}$ ion site with mutually different two kinds or three kinds of metal elements. As a result, by applying the magnetic iron oxide particles of the present invention, a range of an external factor allowable in designing each kind of magnetic material and radio wave absorber is expanded, thus making it possible to perform material design with further flexibility.

BEST MODE FOR CARRYING OUT THE INVENTION

A magnetic material according to the present invention has a structure in which a part of a $Fe^{3+}$ ion site of an epsilon-type magnetic iron oxide particle expressed by a general formula: $\epsilon\text{-}Fe_2O_3$ is replaced with mutually different two or three kinds of metals. Namely, the magnetic material of the present invention is an epsilon-type magnetic iron oxide particle expressed by a general formula $A_xB_yFe_{2-x-y}O_3$ or $\epsilon\text{-}A_xB_yC_zFe_{2-x-y-z}O_3$ (wherein A, B, C are mutually different metal elements excluding Fe, satisfying 0<x, y, z<1).

Note that a component or a compound such as impurities generated during manufacture can be allowed, even in a case of the elements other than the elements described in the above-described formula.

<Regarding Mutually Different Two Kinds or Three Kinds of Metals A, B, C, Excluding Fe>

First, mutually different two kinds or three kinds of metals A, B, C will be described.

In order to stably maintain a crystal structure of $\epsilon\text{-}Fe_2O_3$, bivalent metal A, quadrivalent metal B, and trivalent metal C are preferably used. Further, as preferable examples, one or more kinds of metal elements selected from Co, Ni, Mn, and Zn can be given as A, and Ti can be given as B, and one or more kinds of metal elements selected from In, Ga, and Al can be given as C.

Note that Fe is excluded from A, B, C, and this is because a part of the $Fe^{3+}$ ion site of the $\epsilon\text{-}Fe_2O_3$ is replaced with mutually different two or three kinds of metals.

<2. Regarding a Range of x, y, z>

First, values of x, y will be explained. x, y may fall in a range of 0<x, y<1, and, x and y can be arbitrarily combined. However, from the viewpoint of stability, the relation of x and y is preferably x≈y, and further preferably x=y. This is because defect of electrons in the particle is reduced, and a stable substance can be obtained.

Here, the coercive force of the epsilon-type magnetic iron oxide particle of the present invention can be controlled, in a case of 0≠x, y. However, when a target control range of the coercive force is great, 0.1≦x, y is preferable.

Meanwhile, in a case of x, y<1, the magnetic particle can be utilized for the purpose of magnetic recording. However, in order to obtain a further suitable coercive force for magnetic recording, x, y ≦0.5 is preferable.

Accordingly, from the above-described knowledge, the range of x, y is set to satisfy 0<x, y<1, and preferably satisfy 0.1≦x, y<1, and more preferably satisfy 0.1≦x, y≦0.5. Then, x≈y is preferable and x=y is further preferable.

By adding different, kind of elements to the epsilon-type magnetic iron oxide particle to satisfy the above-described structure, Hc possessed by the magnetic material can be relatively easily controlled by an amount of the added elements. As a result, when this magnetic material is applied to magnetic recording, the coercive force can be controlled to a level sufficient to allow the magnetic material to be utilized in a publicly-known and publicly-used magnetic recording head.

Next, the value of z will be explained. The value of z may also fall within a range of 0<z<1, and further preferably within a range of 0<z≦0.5. If element C is added to the epsilon-type magnetic oxide particle of the present invention, the coercive force of the particle can be arbitrarily controlled, and in addition, a $\epsilon\text{-}Fe_2O_3$ single phase particle can be easily obtained, and this is preferable. In a case of a purpose of use requiring the single phase particle as the epsilon-type magnetic iron oxide particle, three elements of A, B, C are added. In a case that a composite phase structure is also acceptable, two elements of A, B may also be added.

<3. Regarding Curie Point of the Magnetic Material of the Present Invention>

One of the merits of the magnetic characteristics in the magnetic material of the present invention is that the coercive force can be controlled without greatly lowering the Curie point. From the viewpoint of practicality, high Curie point is preferable in holding record, and specifically the Curie point is desired to be 430K or more, and more preferably 440K or more.

In the particle of the present invention, for example, Ni is used as A, and Ti is used as B, and the Curie point of $\epsilon\text{-}Ni_{0.15}Ti_{0.15}Fe_{1.70}O_3$ obtained in a case of x=0.15 is 448K. Meanwhile, $\epsilon\text{-}In_xFe_{2-x}O_3$ of a conventional technique has the magnetic characteristic similar to the magnetic characteristic of the $\epsilon\text{-}Ni_{0.15}Ti_{0.15}Fe_{1.70}O_3$. However, in a case of $\epsilon\text{-}In_{0.18}Fe_{1.82}O_3$ satisfying x=0.18, the Curie point becomes 425K. Namely, it is found that a difference between both Curie points is as much as about 20 to 25K.

From the aforementioned result, the magnetic particle of the present invention having excellent heat stability can be obtained, while having magnetic characteristics equivalent to that of the magnetic particle of the conventional technique.

<4. Hc Control of the Magnetic Material of the Present Invention>

As described above, the magnetic material of the present invention maintains high Hc at a normal temperature, by suitably adjusting the values of x, y. Further, since the magnetic material of the present invention is a fine particle, high integration can be achieved, and can be suitably used as the magnetic material for high density magnetic recording. Particularly, the value of Hc can be controlled to a desired value, by controlling replacement amount of bivalent metal A (excluding Fe) and quadrivalent metal B (values of x, y), and further by controlling the replacement amount of trivalent metal C (value of z). Further, the saturation magnetization can also be set higher than that of $\epsilon\text{-}Fe_2O_3$, by controlling the values of x, y, z. Accordingly, by using the magnetic material according to the present invention, it is possible to constitute a target magnetic layer adapted to the magnetic characteristics requested on the side of a product such as a magnetic recording medium.

Note that the magnetic material of the present invention can also be used in a state of being mixed with $\epsilon\text{-}Fe_2O_3$ particle of a conventional technique.

<5. Method for Improving Durability of the Magnetic Material of the Present Invention>

The magnetic material of the present invention is $\epsilon\text{-Fe}_2\text{O}_3$ particle, with a part of the Fe site replaced, which is an oxide and therefore has a high oxidation resistance, if compared with a metal magnetic particle. However, element Fe itself is an element which easily causes chemical reaction, and therefore it is difficult to completely prevent a complex forming and a reaction with acid.

For example, when a magnetic tape is used under a condition of high temperature and humidity for a long time, the magnetic particle causes to react with resin and dispersant in the tape, to thereby cause to generate a metallic complex in some cases. When such a generated metallic complex adheres and reacts to/with a surface of the magnetic head, space between the tape and the head is widened, to cause deterioration of strength of a recording signal, with a result that recorded contents can not be read in a worst case.

Further, for example, there is a possibility that a corrosive gas generated by gas component and moisture such as $H_2S$, $Cl_2$, $NO_2$ contained in the atmospheric air, causes the magnetic particle to be corrosive.

Here, when the surface of each particle of the magnetic material of the present invention is covered with a chemically-stable non-magnetic compound such as silica, a great resistance force is exhibited to a complexing agent and acid, thus producing the magnetic material excellent in durability, weathering resistance, and reliability.

Specifically, it is preferable that silica of 100 mass % or less is added to the magnetic material of the present invention, and the magnetic material is covered with this silica thin film. Powders composed of particles of the magnetic material of the present invention covered with a thin film of the non-magnetic compound such as silica, is excellent in durability, weathering resistance, and reliability. Note that as the non-magnetic compound forming such a coating, a heat-resistant compound such as alumina and zirconia may also be acceptable, other than silica.

<6. Magnetic Recording Tape for Data Backup Using the Magnetic Material of the Present Invention>

For example, the magnetic recording tape for data backup with higher density will be explained as an example.

In the magnetic recording tape for data backup, commercially available at present, TEM average particle volume of the magnetic particle is 10000 $nm^3$ or more in most cases. However, in order to obtain a recording density with higher density, it is considered that further finer magnetic particle is requested. From this viewpoint, the magnetic material of the present invention is a fine particle, and therefore the aforementioned request can be satisfied. This is because, when the magnetic layer for magnetic recording is constituted by using the magnetic material of the present invention, each particle is sufficiently fine to be formed in a single magnetic domain structure, and therefore the magnetic layer with high magnetic recording density can be constituted. When this viewpoint is taken into consideration, a preferable TEM average particle volume of the magnetic material of the present invention is 10000 $nm^3$ or less and further preferably is 8000 $nm^3$ or less, and most preferably is 5000 $nm^3$ or less.

Note that the TEM average particle volume is obtained as follows. An average size of 300 particles is obtained, which are selected at random from an image observed by a TEM (Transmission Electron Microscope) wherein the magnetic material of the present invention is expanded by 300,000-times magnification, and a particle shape having this average particle size is observed, wherein the particle, with an aspect ratio (long axis/short axis) of 1.5 or more, has approximately a columnar shape. Then, a volume of the particle is calculated by using a long axial diameter, with the short axis set as a diameter of a circle of this particle and the long axis set as a height of a column, wherein the particle, with the aspect ratio of less than 1.5, has approximately a spherical shape.

<7. Coating Type Magnetic Recording Medium Using the Magnetic Material of the Present Invention>

In order to constitute the magnetic layer of the coating type magnetic recording medium using the particle of the magnetic material of the present invention, the particle, with the TEM average particle volume set to 10000 $nm^3$ or less, may be fixed to a support. At this time, a magnetic easy axis of each particle crystal is oriented in a prescribed direction. With this structure, the magnetic layer of the magnetic recording medium suitable for high density recording can be obtained.

<8. Further Application Field of the Magnetic Material of the Present Invention>

Thus, the magnetic material of the present invention is useful for the purpose of use of a high density magnetic recording medium. In addition, the magnetic material of the present invention has stability of a substance, being an oxide, and excellent magnetic characteristics, and therefore it is considered that this magnetic material can be used in a radio wave absorber, a nano scale electronics material, a permanent magnetic material, a biomolecule labeling reagent, and a drug carrier, etc.

<9. Manufacturing Method of the Magnetic Material of the Present Invention>

The magnetic material of the present invention can be manufactured by using various methods represented by a combination of a Micelle method and a Sol-Gel method, Several examples of such methods will be described hereinafter while giving typical examples therefore.

(1) Combination of the Reverse Micelle Method and the Sol-Gel Method

The reverse Micelle method includes the step of progressing a precipitation reaction of iron hydroxide in Micelle, by mixing two kinds of solutions of Micelle solution α (raw material micelle) containing a surfactant agent, and Micelle solution β (neutralizer micelle). Meanwhile, the Sol-Gel method includes the step of applying silica coating to the surface of the iron hydroxide particle generated in the micelle.

By combining both methods of the reverse Micelle method and the Sol-Gel method, an iron hydroxide particle having a layer coated with silica can be obtained. The obtained iron hydroxide particle having silica coating is separated from a liquid, and thereafter is subjected to heat treatment in an air atmosphere at a prescribed temperature (within a range of 700 to 1300° C.), to thereby generate the $\epsilon\text{-Fe}_2\text{O}_3$ single phase particle.

Specific examples therefore will be described hereinafter.

First, iron nitrate (III) and surfactant agent (such as cetyl-trimethyl-ammonium bromide (described as CTAB in some cases in this specification) are dissolved into a Water phase of the Micelle solution α, with n-octane as an oil phase. At this time, there is no problem in adding a straight chain alcohol such as butyl alcohol, to efficiently dissolve the CTAB. Here, a part of the iron nitrate (III) dissolved in the water phase of the micelle solution α is replaced with other metals A, B, C.

Similarly, ammonia aqueous solution is used for the water phase of the micelle solution β, with n-octane as the oil phase.

Note that nitrate of a suitable amount of alkaline earth metal (such as Ba, Sr, Ca) can also be dissolved into the water phase of the micelle solution α as a shape control agent. The $\epsilon\text{-Fe}_2\text{O}_3$ single phase particle can also be formed into a rod-like shape by adding such a shape control agent. However, this alkaline earth metal sometimes remains in a surface layer part of a generated crystal. In this case, an influence of this shape control agent on other properties is not strong so much, unless content of the remained alkaline earth metal exceeds 8 mass %. Accordingly, at least 8 mass % or less of one kind of the alkaline earth metal elements can be added to a raw material of the magnetic material of the present invention, as the shape control agent.

The micelle solutions α and β are mixed and silane is suitably added thereto, and by the Sol-Gel method, coating by silica is applied to the surface of the obtained iron hydroxide particle having the rod-like shape or the other shape. These reactions occur in the micelle, and within the micelle, hydrolysis occurs on the surface of nano-order fine iron hydroxide particle, and the particle, with the surface coated with silica, can be obtained.

Subsequently, the iron hydroxide particle coated with silica is separated from the liquid, which is then subjected to washing and drying, to thereby obtain iron hydroxide particle powders. The obtained particle powders are charged into a furnace, and heat treatment (sintering) is applied thereto in a temperature range of 700 to 1300° C. in the air atmosphere. By this heat treatment, oxidation reaction of the iron hydroxide particle is progressed in a silica shell, to thereby generate fine $\epsilon\text{-Fe}_2O_3$ particle. At the time of such an oxidation reaction, it can be considered that coating of the iron hydroxide particle with silica, contributes not to generate $\alpha\text{-Fe}_2O_3$ and $\gamma\text{-Fe}_2O_3$, but to generate the $\epsilon\text{-Fe}_2O_3$ single phase particle. In addition, this silica coat functions to prevent sintering of particles. Further, as described above; when the alkaline earth metal coexists as a suitable amount of shape retaining agent, the iron hydroxide particle is easily grown to the rod-like $\epsilon\text{-Fe}_2O_3$ single phase particle.

Thus, $\epsilon\text{-A}_xB_yFe_{2-x-y}O_3$ single phase particle and $\epsilon\text{-A}_xB_yC_zFe_{2-x-y-z}O_3$ single phase particle, with a part of the Fe site replaced, can be synthesized, while having the same crystal structure as that of $\epsilon\text{-Fe}_2O_3$.

(2) Manufacture by a System of Water-Surfactant Agent, without Adding a Hydrophobic Organic Solvent In the "manufacturing method by combination of the reverse Micelle method and the Sol-Gel method" described in (1), $\epsilon\text{-Fe}_2O_3$ crystal can be synthesized in the system of only water-surfactant agent.

This will be explained hereinafter, with specific examples given therefore.

Defined amount of iron nitrate (III) and replaced elements A, B, C are dissolved into pure water, and CTAB is added and dissolved thereinto as the surfactant agent, to obtain a raw material solution.

Meanwhile, CTAB is added to an ammonia aqueous solution as the surfactant agent, to obtain a neutralizer solution. At that time, there is no problem in adding straight chain alcohol such as butyl alcohol thereto, so as to efficiently dissolve the CTAB.

The raw material solution and the neutralizer solution are stirred and mixed, to thereby progress a neutralizing reaction. Color of liquid is turned into red-brown, and the liquid is turned into a mixed solution in which hydroxide of iron is generated. Then, tetraethoxysilane is dropped into the mixed solution and is continued to be stirred.

A precipitate is recovered from the solution which is continued to be stirred. The recovered precipitate (precursor) is washed multiple number of times by using the mixed solution of chloroform and methanol. Then, the precipitate (precursor) after washing is dried, and thereafter is subjected to heat treatment in a furnace in the air atmosphere, to thereby obtain heat treated powders.

The obtained heat treated powders are stirred in a NaOH aqueous solution, to perform removing process of a silicon oxide on the surface of the heat treated powders. Subsequently, the heat treated powders are filtered and washed with water and dried, to thereby obtain the $\epsilon\text{-Fe}_2O_3$ single phase particle.

(3) Manufacture by the System of Water-Hydrophobic Organic Solvent, without Adding the Surfactant Agent In the "manufacturing method by combination of the reverse Micelle method and the Sol-Gel method" described in (1), $\epsilon\text{-Fe}_2O_3$ crystal can also be synthesized in the system of water-organic solvent (n-octane), without adding the surfactant agent This will be explained hereinafter, with specific examples given therefore.

Defined amount of iron nitrate (III) and replaced elements A, B, C are dissolved into the water phase of the Micelle solution α, with n-octane as the oil phase, to obtain the raw material solution.

In the same way, the ammonia aqueous solution is added to the water phase of the micelle solution β, with n-octane as the oil phase, to obtain the neutralizer solution.

Thereafter, the $\epsilon\text{-Fe}_2O_3$ single phase particle can be manufactured, by performing an operation similar to the operation of "(2) the manufacturing method by the system of water-surfactant agent, without adding the hydrophobic organic solvent".

(4) Manufacturing Method by the System of Only a Water Solvent, without Using the Surfactant Agent or the Organic Solvent In the "manufacturing method by combination of the reverse Micelle method and the Sol-Gel method" described in (1), the $\epsilon\text{-Fe}_2O_3$ crystal can also be synthesized in the system of only the water solvent, with adding neither surfactant agent nor the organic solvent.

This will be explained hereinafter, with specific examples given therefore.

Defined amount of iron nitrate (III) and replaced elements A, B, C are dissolved into aqueous solution, with n-octane as the oil phase, to obtain the raw material solution.

Meanwhile, the ammonia aqueous solution is set as the neutralizing solution.

Thereafter, in the same way as the "manufacturing method by the system of water-surfactant agent, without adding hydrophobic organic solvent", the $\epsilon\text{-Fe}_2O_3$ single phase particle can be manufactured.

In the iron oxide particle expressed by a general formula $\epsilon\text{-A}_xB_yFe_{2-x-y}O_3$ or $\epsilon\text{-A}_xB_yC_zFe_{2-x-y}O_3$ manufactured by any one of the aforementioned manufacturing methods of (1) to (4), silica coat generated on the surface of the iron hydroxide particle by the Sol-Gel method, may remain on the surface of the crystal particle after heat treatment. When the surfaces of the $\epsilon\text{-A}_xB_yFe_{2-x-y}O_3$ particle obtained by combination of bivalent and quadrivalent metal elements, and $\epsilon\text{-A}_xB_yC_zFe_{2-x-y-z}O_3$ particle obtained by combination of bivalent, trivalent, and quadrivalent metal elements, are covered with a thin film of the non-magnetic compound such as silica, there is an advantage in an aspect of easy handling of this particle powder and improving durability, weathering resistance, and reliability, in a case that this particle powder is supplied to the magnetic material for various purposes of use, and this is desirable.

EXAMPLES

Example 1

As described in table 1, In this example, a sample is synthesized, with a mixing composition expressed by $\epsilon\text{-Ti}_{0.15}\text{CO}_{0.15}\text{Fe}_{1.7}O_3$.

Explanation will be given for a synthesis of this sample hereinafter, in a case of not using the organic solvent and adding neither surfactant agent nor shape retaining agent <A>, and in a case of using the organic solvent and adding both of the surfactant agent and the shape retaining agent <B>.

<A> The Case of not Using the Organic Solvent and Adding Neither Surfactant Agent Nor Shape Retaining Agent

[Procedure 1]

Two kinds of solutions of solution A and neutralizer solution B are prepared as will be described below.

(Preparation of the Solution A)

Pure water 24.3 mL is put in a Teflon (registered trademark) flask, and iron nitrate (III) 9 hydrate 0.0252 mol (1030 mg), cobalt nitrate (II) 6 hydrate 0.00017 mol (66 mg), and titanium sulfate (IV) n hydrate 0.00026 mol (76 mg) are added thereto. At this time, the mixing composition is set to $Ti_{0.15}Co_{0.15}Fe_{1.7}O_3$. After completion of addition, they are stirred and dissolved, to thereby obtain the solution A.

(Preparation of the Neutralizer Solution B)

Ammonia aqueous solution 2.0 mL with concentration of 25% is mixed into pure water 22.3 mL and is stirred, to thereby obtain the solution B.

[Procedure 2]

The neutralizer solution B is dropped into the solution A. After completion of the drop, the obtained mixed solution is continued to be stirred for 30 minutes.

[Procedure 3]

Tetraethoxysilane 0.49 mL is added to the mixed solution obtained in procedure 2, while stirring this mixed solution. Then, after addition, stirring is continued for about one day.

[Procedure 4]

The mixed solution obtained by procedure 3 is filtered, and the precipitate is taken and is washed with pure water.

[Procedure 5]

After the precipitate obtained in procedure 4 is dried, heat treatment is applied thereto at 1100° C. for 4 hours in a furnace set in the air atmosphere, to thereby obtain heat treated powders.

[Procedure 6]

The heat treated powders obtained in procedure 5 are mixed into NaOH aqueous solution having 2 mol/L concentration, then is stirred for 24 hours, and removing process is performed to remove silica that exists on the surface of the particle of the heat treated powder. Subsequently to the removing process of the silica, the heat treated powders are filtered, washed with water, and dried, to thereby obtain the sample of example 1<A>.

Figure 3:
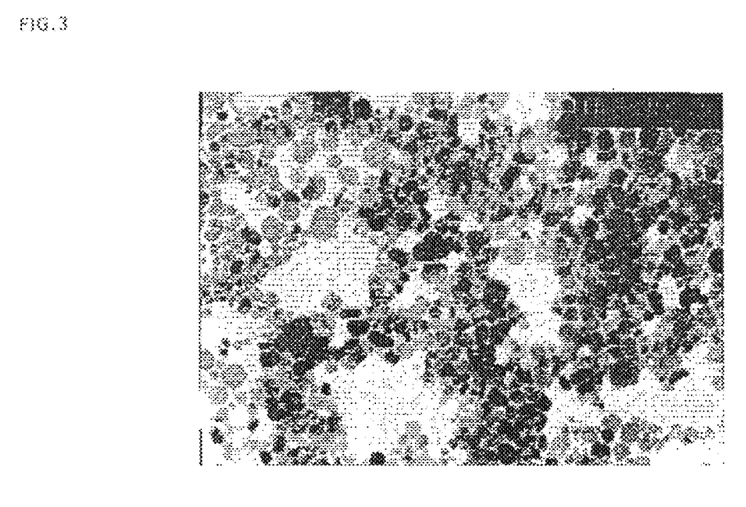
FIG. 3 shows a TEM image of the sample of the magnetic iron oxide according to the example 1.

The TEM image of the sample of the example 1<A> is shown in FIG. 3. Note that this TEM image is a photograph of ×300000, and a size of an original photograph is vertically 16.9 cm×horizontally 23.9 cm. However, the image is zoomed out and is displayed in this specification (note that the TEM image of the sample of example 11 (FIG. 6), example 17 (FIG. 9), and comparative example 1 (FIG. 12) are also observed similarly and displayed).

Composition analysis was performed to the obtained sample of example 1<A>, by using an Inductively Coupled Plasma Atomic Emission Spectrometer ICP (IRIS/AP) by Nippon Jarrell-Ash Co. Ltd. The analysis result is shown in table 2. When a composition ratio is calculated from this analysis result, $\epsilon\text{-}Ti_{0.15}Co_{0.15}Fe_{1.7}O_3$ is obtained. This composition ratio is shown in table 3.

According to a measurement result of the sample of the example 1<A> obtained from the TEM (JEM-100CX Mark-II by JEOL. Ltd.) photograph, an average length of the particle was 18.34 nm, a standard deviation was 9.70 nm, and coefficient of variation was 52.88%. The evaluation results of such particle properties are shown in table 4.

Figure 1:
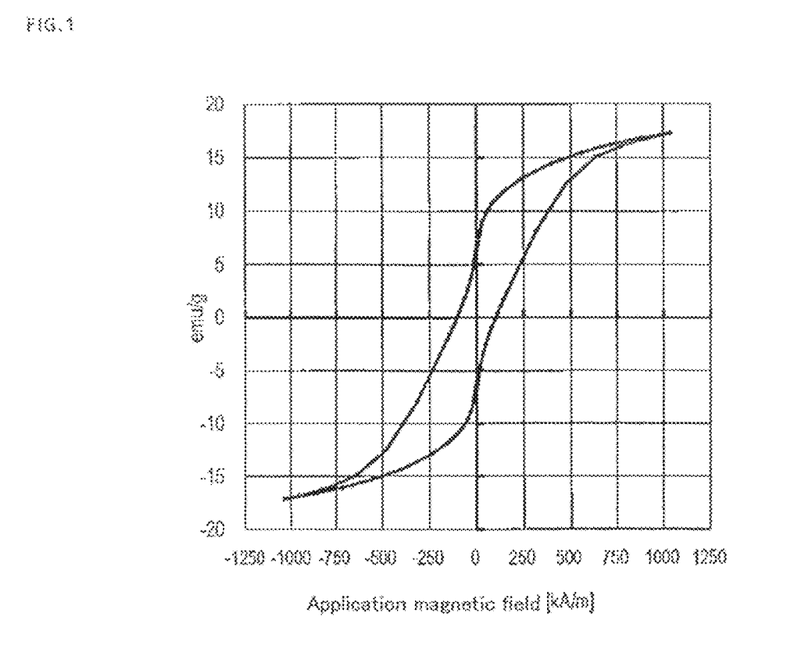
FIG. 1 shows a hysteresis Loop of a sample of magnetic iron oxide according to example 1.
Figure 2:
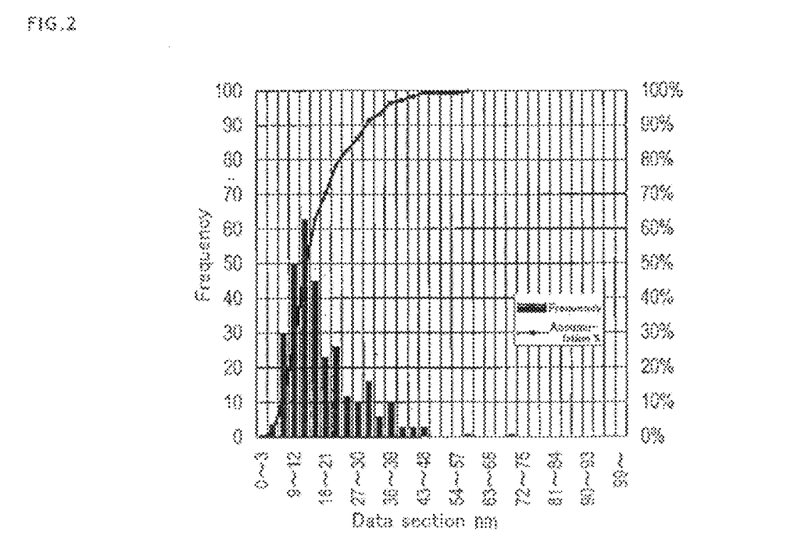
FIG. 2 shows data of a particle size distribution of the sample of the magnetic iron oxide according to the example 1.

Regarding the sample of the example 1<A>, the magnetic characteristics were measured in a magnetic field of 1034 kA/m(13 kOe), by using VSM (by Digital Measurement Systems Co. Ltd.). The result was as follows; the particle was obtained, with coercive force Hc=103.4 kA/m (1299 Oe), saturation magnetization σs=17.19 Am²/kg, residual magnetization σr=6.41 Am²/kg. The result of this magnetic characteristics evaluation is shown in table 4. Further, a magnetic hysteresis loop of the obtained particle is shown in FIG. 1, and a particle size distribution is shown in FIG. 2 (note that the hysteresis loop and the particle size distribution of examples 11, 17 and comparative example 1 are also similarly measured).

Further, regarding the sample of the example 1<A>, magnetization was measured at each temperature in an external magnetic field of 1000 Oe, by using a Superconducting Quantum Interference Device (SQUID/MPMS7 by Quantum Design Co. Ltd.). This measurement was performed by measuring the magnetization of the sample, while heating the sample at a temperature increase rate of 1K/min up to not less than a magnetic phase transition temperature and cooling the sample at a temperature decrease rate of 1K/min. As a result of this measurement, it was found that the Curie point (Tc) of the sample was 447K. As a result, it is also found that lowering of the Curie point (Tc) of $\epsilon\text{-}Fe_2O_3$ from 495K is within 48K. The evaluation result is shown in table 5.

<B> The Case of Using the Organic Solvent and Adding Both of the Surfactant Agent and the Shape Retaining Agent

[Procedure 1]

Two kinds of micelle solutions of micelle solution α and micelle solution β as will be described below are prepared.

(Synthesis of the Micelle Solution α)

Titanium tetrachloride 12.4 μL is added to HCl solution 6 mL having concentration of 1 mol/L and is dissolved therein. Iron nitrate (III) 9 hydrate 515 mg and barium nitrate 39 mg are added to this solution and dissolved therein. Thereafter, cobalt nitrate (II) 6 hydrate 32.7 mg is added thereto and dissolved therein. Further, CTAB 3.52 g, octane 18.3 ml and 1-butanol 3.6 ml are added thereto and are stirred and dissolved therein, to thereby obtain the micelle solution α.

(Synthesis of the Micelle Solution β)

25% of ammonia aqueous solution 2.5 ml is mixed into pure water 3.5 ml and is stirred, to thereby obtain the micelle solution β.

[Procedure 2]

The micelle solution β is dropped into the micelle solution α. After drop of the micelle solution β, the mixed solution is continued to be stirred for 30 minutes.

[Procedure 3]

Tetraethoxysilane 1.5 mL is added to the mixed solution obtained in procedure 2, while stirring this mixed solution. Then, stirring is continued for about one day.

[Procedure 4]

The mixed solution obtained in procedure 3 is separated by centrifugalization to recover the precipitate. The recovered precipitate is washed multiple number of times by using the mixed solution of chloroform and methanol, and thereafter is further washed multiple number of times only by methanol.

[Procedure 5]

The precipitate obtained in procedure 4 is dried, and thereafter heat treatment is applied thereto at 975° C. for 4 hours in the furnace set in the air atmosphere, to thereby obtain the heat treated powders.

[Procedure 6]

The heat treated powders obtained in procedure 5 are mixed into NaOH aqueous solution having concentration of 2 mol/L, then are stirred for 24 hours, and removing process is performed for removing silica that exists on the surface of the particle of the heat treated powders. Subsequently to the removing processing of the silica, the heat treated powders are filtered, washed with water, and dried, to obtain the sample of example 1<B>.

Regarding the obtained sample of the example 1<B>, X-ray Fluorescence Analysis (JSX-3220 by JEOL Ltd.) was performed. Then, the composition ratio was calculated from this analysis result. It was found that the composition ratio was expressed by $\epsilon\text{-}Ti_{0.15}Co_{0.15}Fe_{1.70}O_3$ when molar ratio of Ti, Co, Fe is expressed by Ti:Co:Fe=x:y:(2−x−y), satisfying x=y=0.15.

Regarding the sample of the example 1<B>, in the same ways as the case of the sample of the example 1<A>, the Curie point (Tc) was measured, and in the same way as the sample of the example 1<A>, the value of 447K was obtained. The evaluation result is shown in table 5.

As a result, it was confirmed that no influence was given to the Curie point (Tc), depending on a difference of the manufacturing methods and the presence/absence of the shape retaining agent.

Examples 2 to 9

Samples of examples 2 to 9 were prepared, with mixing composition of raw materials changed. Regarding the manufacturing method of each sample, manufacturing methods of examples 2, 3, 5 to 9 are the same as the manufacturing method of the example 1<A>, and the manufacturing method of the example 4 is the same as that of the example 1<B>. At this time, as each raw material of Ni, Mn, and Zn, nitrate of them were used.

The mixing compositions of raw materials of samples of examples 2 to 9 are shown in table 1.

In the same way as the example 1, the composition analysis was performed to each manufactured sample, and the result was shown in table 2.

Next, from this composition analysis result, a constitutional ratio of a product of each sample was calculated and described in table 3.

Then, in the same way as the example 1, evaluation of particle properties Was performed to each sample, and evaluation result was shown in table 4.

Further, in the same way as the example 1, measurement of the magnetic characteristics was performed to each sample, and the result of the evaluation of the magnetic characteristics was shown in table 4.

Further, regarding the example 4, when the Curie point (Tc) was measured, it was 449K. As a result, it is found that lowering of Tc from $\epsilon\text{-}Fe_2O_3$ (Tc=495K) is within 46K. Such an evaluation result was shown in table 5.

Example 10

In this example, $\epsilon\text{-}Fe_2O_3$ crystal was synthesized with neither organic solvent nor surfactant agent added thereto, in accordance with the following procedures. Note that the mixing composition is shown in table 1.

[Procedure 1]

No kinds of solutions of the raw material solution and the neutralizer solution are prepared.

(Preparation of the Raw Material Solution)

Pure water 24.3 mL is put in the Teflon (registered trademark) flask. Iron nitrate (III) 9 hydrate 848 mg, aluminum nitrate (III) 8 hydrate 406 mg, titanium sulfate (IV) n hydrate 25 mg, and cobalt nitrate (II) 6 hydrate 22 mg are respectively charged thereinto, and are sufficiently stirred and dissolved at a room temperature, to thereby obtain the raw material solution.

Note that at this time, the mixing ratio is set to $Ti_{0.05}Co_{0.05}Al_{0.5}Fe_{1.4}O_3$.

(Preparation of the Neutralizer Solution)

Ammonia solution 2.0 mL with concentration of 25% is mixed into pure water 22.3 mL and is stirred, to thereby obtain the neutralizer solution.

[Procedure 2]

The neutralizer solution is dropped into this raw material solution, while sufficiently stirring the raw material solution at 1500 rpm, and both solutions are stirred and mixed, to advance a neutralizing reaction. After total amount of the neutralizing solution is dropped, the mixed solution is continued to be stirred for 30 minutes. The color of liquid is turned into red-brown, and it is found that hydroxide of iron is generated.

[Procedure 3]

Tetraethoxysilane 0.495 mL is dropped into the mixed solution obtained in procedure 2, while stirring this mixed solution, and is continued to be stirred for about one day.

Thereafter, the same operation as operations of procedures 4 to 6 described in the example 1<A> is performed to the mixed solution obtained in procedure 3, to thereby obtain the sample of example 10.

In the same way as the example 1, the composition analysis is performed to the sample of the example 10, and the constitutional ratio of the product, being the sample, was calculated from the analysis result. Such an analysis result is shown in table 2, and the constitutional ratio of the product is shown in table 3.

Then, in the same way as the example 1, the evaluation of the particle properties is performed to the sample of the example 10, and such an evaluation result is shown in table 4.

Further, in the same way as the example 1, the measurement of the magnetic characteristics is performed to the sample of the example 10, and such an evaluation result of the magnetic characteristics is shown in table 4.

Examples 11 to 28

Samples of examples 11 to 28 were prepared, with the mixing composition of the raw materials changed. The manufacturing method of each sample is the same as that of the example 10. At this time, as each raw material of Ni, Mn, Zn, and Ga, the nitrate of them were used.

The mixing composition of the raw materials of the samples of the examples 11 to 28 are shown in table 1.

In the same way as the example 1, the composition analysts was performed to each manufactured sample, and the result was shown in table 2.

Next, the constitutional ratio of the product in each sample was calculated from the result of the composition analysis, and were shown in table 3.

Then, in the same way as the example 1, the evaluation of the particle properties was performed to each sample, and such an evaluation results were shown in table 4.

Further, in the same way as the example 1, the measurement of the magnetic characteristics was performed to each sample, and such an evaluation result of the magnetic characteristics were shown in table 4.

Figure 6:
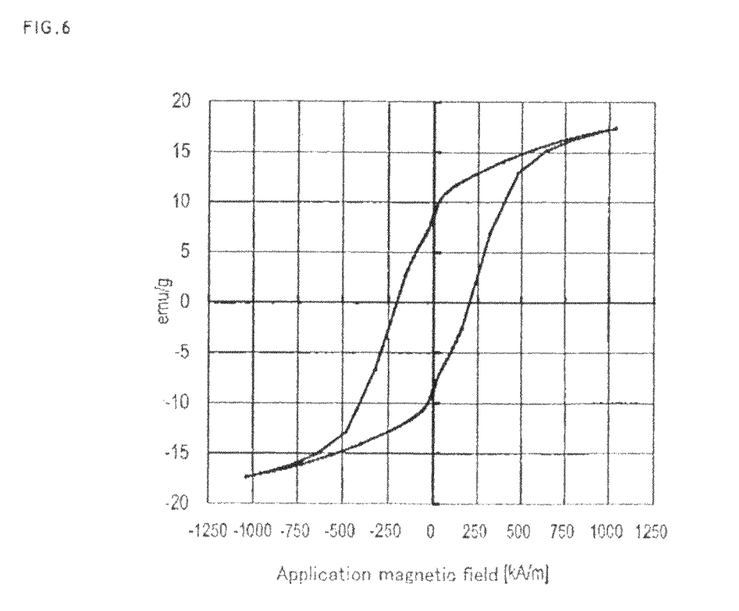
FIG. 6 shows the TEM image of the sample of the magnetic iron oxide according to the example 11.
Figure 9:
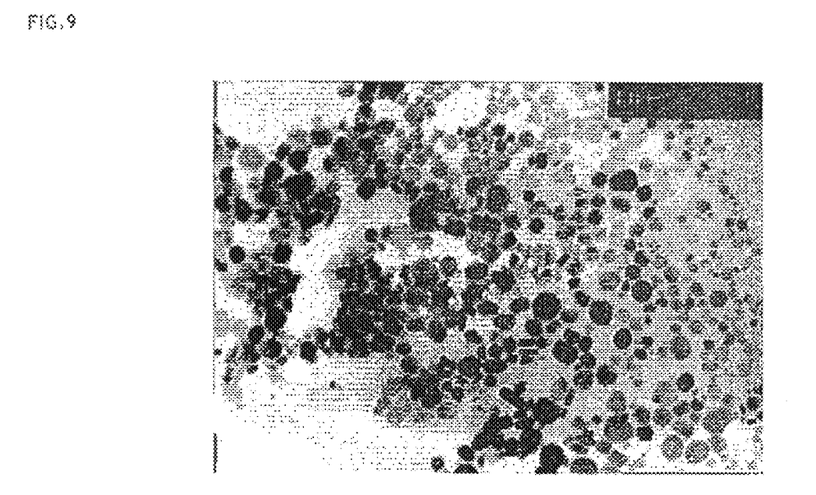
FIG. 9 shows the TEM Image of the sample of the magnetic iron oxide according to the example 17.

The TEM image of the sample of the example 11 is shown in FIG. 6, and the TEM image of the sample of the example 17 is shown in FIG. 9. Note that the TEM images are photographs of ×300000.

Figure 5:
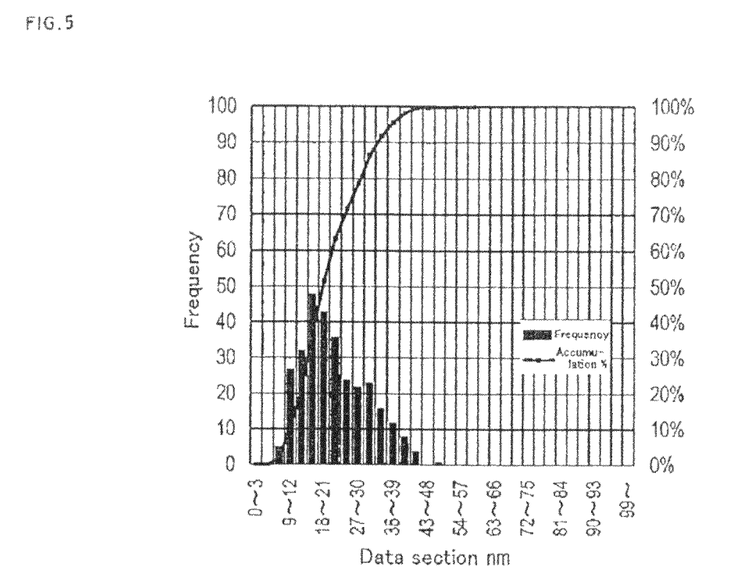
FIG. 5 shows particle size distribution data of the sample of the magnetic iron oxide according to the example 11.
Figure 8:
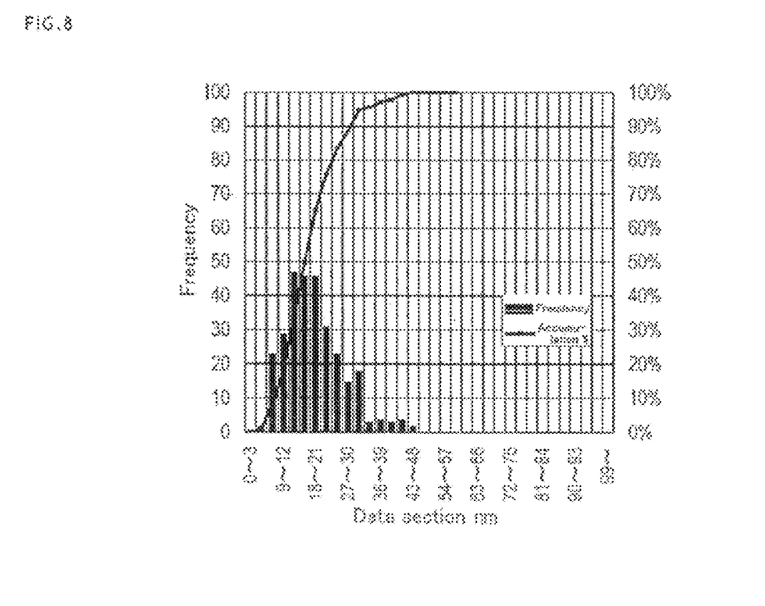
FIG. 8 shows the data of the particle size distribution of the sample of the magnetic iron oxide according to the example 17.

Then, the particle size distribution of the sample of the example 11 is shown in FIG. 5, and the particle size distribution of the sample of the example 17 is shown in FIG. 8.

Figure 4:
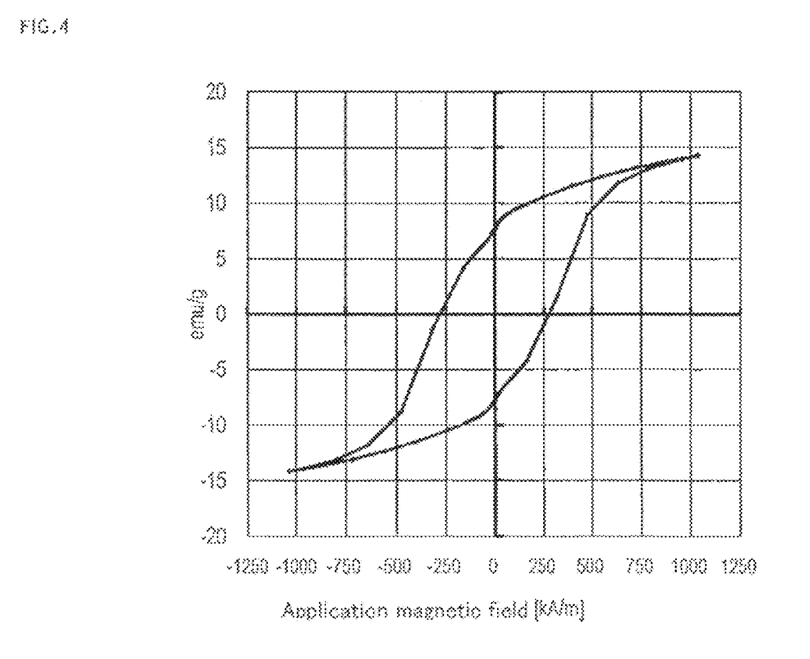
FIG. 4 shows the hysteresis loop of the sample of the magnetic iron oxide according to example 11.
Figure 7:
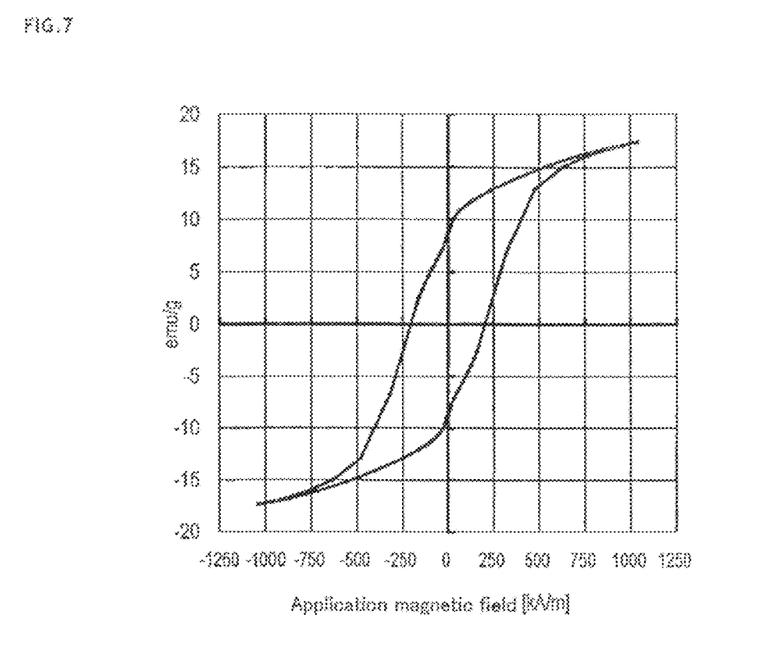
FIG. 7 shows the hysteresis loop of the sample of the magnetic iron oxide according to example 17.

Further, the hysteresis loop of the sample of the example 11 is shown in FIG. 4, and the hysteresis loop of the sample of the example 17 is shown in FIG. 7.

Example 29

In this example, the $\epsilon$-$Fe_2O_3$ crystal was synthesized, in accordance with the following procedures. Note that the mixing composition is shown in table 1.
[Procedure 1]
Two kinds of solutions of the raw material solution and the neutralizer solution are prepared.
(Preparation of the Raw Material Solution)
Pure water 24.3 mL is put in the Teflon (registered trademark) flask. Iron nitrate (III) 9 hydrate 970 mg, gallium nitrate (III) 9 hydrate 190 mg, titanium sulfate (IV) n hydrate 25 mg, and cobalt nitrate (II) 6 hydrate 22 mg are respectively charged thereinto, and are sufficiently stirred and dissolved at a room temperature, to thereby obtain the raw material solution. At this time, the mixing composition is set to $Ti_{0.05}Co_{0.05}Ga_{0.3}Fe_{1.6}O_3$.
(Preparation of the Neutralizer Solution)
The preparation of the neutralizer solution is performed in the same way as that of the example 10.
[Procedure 2]
Thereafter, the operation similar to the operation of the example 10 is performed, to thereby obtain the sample of example 29.

In the same way as the example 1, the composition analysis was performed to the manufactured sample of the example 29, and the result was shown in table 2.

Next, the constitutional ratios of the product in the sample of the example 29 were calculated from the result of the composition analysis, and were shown in table 3.

Then, in the same way as the example 1, the evaluation of the particle properties was performed to the sample of the example 29, and such evaluation result was shown in table 4.

Further, in the same way as the example 1, the measurement of the magnetic characteristics was performed to the sample of the example 29, and the result of the evaluation of the magnetic characteristics was shown in table 4.

Further, regarding the sample of the example 29, when the Curie points (Tc) were measured, it was 431K. As a result, it is found that lowering of Tc from $\epsilon$-$Fe_2O_3$ (Tc=495K) is within 64K. Such an evaluation result were shown in table 5.

Examples 30 and 31

Samples of examples 30 and 31 were prepared, with the mixing composition of the raw materials changed. The manufacturing method of each sample is the same as that of the example 29.

In the same way as the example 1, the composition analysis was performed to the manufactured samples of the examples 30 and 31, and the results were shown in table 2.

Next, the constitutional ratio of the product in the samples of the examples 30 and 31 was calculated from the result of the composition analysis, and was shown in table 3.

Then, in the same way as the example 1, the evaluation of the particle properties was performed to the samples of the examples 30 and 31, and the evaluation results were shown in table 4.

Further, the measurement of the magnetic characteristics was performed to the samples of the examples 30 and 31, and the evaluation result of the magnetic characteristics was shown in table 4.

Further, regarding the samples of the examples 30 and 31, the Curie point (Tc) was measured, and the evaluation result was shown in table 5.

Comparative example 1

The sample of the comparative example 1, with the mixing composition expressed by $Ti_{0.50}Fe_{1.5}O_3$, was prepared. The manufacturing method of the sample is the same as that of the example 1<B>. The mixing composition was shown in table 1.

In the same way as the example 1, the composition analysis was performed to the manufactured sample of the comparative example 1, and the result was shown in table 2.

Next, the constitutional ratio of the product in the sample of the comparative example 1 was calculated from the result of the composition analysis, and was shown in table 3.

Then, in the same way as the example 1, the evaluation of the particle properties was performed to the sample of the comparative example 1, and the evaluation result was shown in table 4.

Further, in the same way as the example 1, the measurement of the magnetic characteristics was performed to the sample of the comparative example 1, and the result of the evaluation of the magnetic characteristics was shown in table 4.

Figure 12:
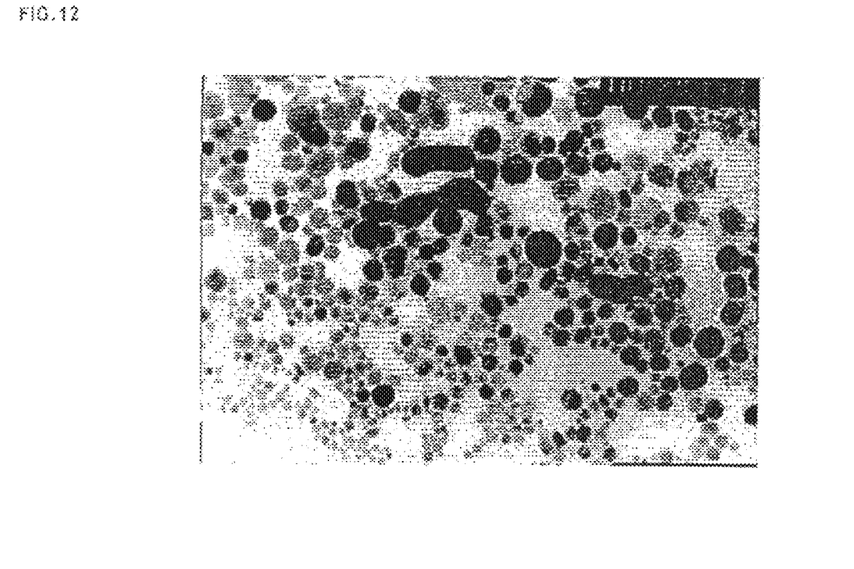
FIG. 12 shows the TEM image of the sample of the magnetic iron oxide according to the comparative example 1.

Further, the TEM image of the manufactured sample of the comparative example 1 is shown in FIG. 12, Note that this TEM image is a photograph of ×300000.

Figure 10:
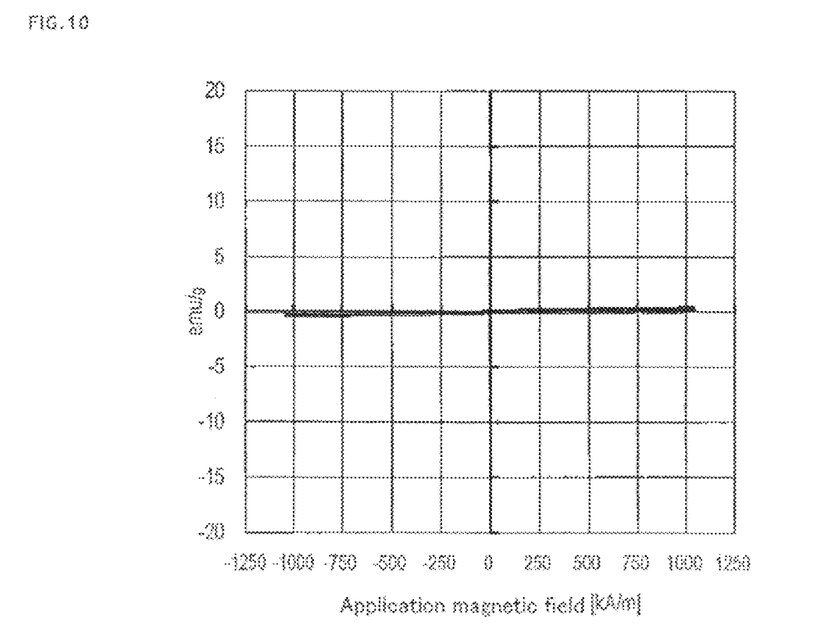
FIG. 10 shows the hysteresis loop of the sample of the magnetic iron oxide according to a comparative example 1.
Figure 11:
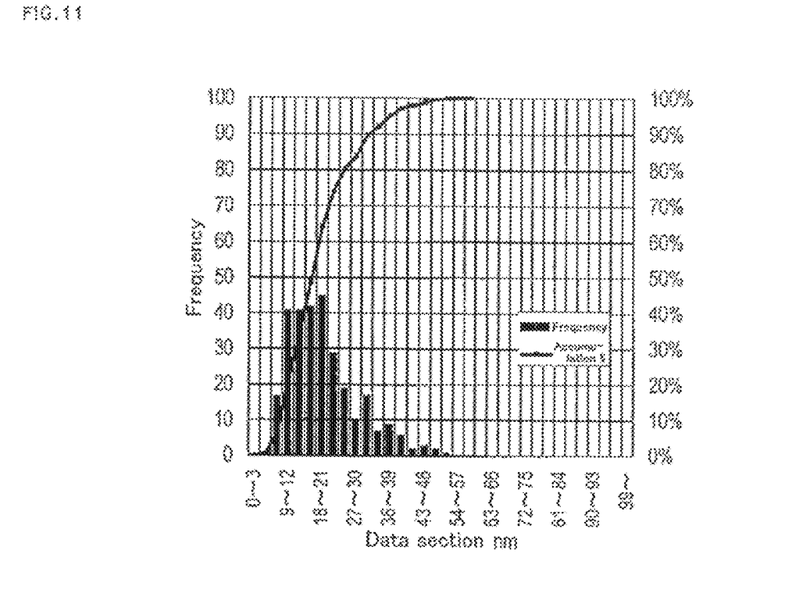
FIG. 11 shows the data of the particle size distribution of the sample of the magnetic iron oxide according to the comparative example 1.

The particle size distribution of the manufactured sample of the comparative example 1 is shown in FIG. 11, and the hysteresis loop is shown in FIG. 10.

Comparative examples 2 to 5

The sample of comparative example 2 with the mixing composition expressed by $CO_{0.30}Fe_{1.7}O_3$, the sample of comparative example 3 with the mixing composition expressed by $Ni_{0.30}Fe_{1.7}O_3$, the sample of comparative example 4 with the mixing composition expressed by $Mn_{0.30}Fe_{1.7}O_3$, and the sample of comparative example 5 with the mixing composition expressed by $Zn_{0.30}Fe_{1.7}O_3$, were prepared. The manufacturing method of each sample is the same as that of the example 1<B>. Such mixing compositions were shown in table 1.

In the same way as the example 1, the composition analysis was performed to the manufactured samples of comparative examples 2 to 5, and the results were shown in table 2.

Next, the constitutional ratio of the product in the samples of the comparative examples 2 to 5 were calculated from the result of the composition analysis, and were shown in table 3.

Then, in the same way as the example 1, the evaluation of the particle properties was performed to the samples of the comparative examples 2 to 5, and the evaluation results were shown in table 4.

Further, in the same way as the example 1, the measurement of the magnetic characteristics Was performed to the samples of the comparative examples 2 to 5, and the results of the evaluation of the magnetic characteristics were shown in table 4.

Comparative example 6

In this comparative example, Ga replacing-type $\epsilon\text{-Fe}_2\text{O}_3$ crystal was synthesized, in accordance with the following procedures. Note that the mixing composition is shown in table 1.

[Procedure 1]

Two kinds of the micelle solutions of micelle solution I and micelle solution II are prepared.

(Preparation of the Micelle Solution I)

Pure water 6 mL, n-octane 18.3 mL, and 1-butanol 3.6 mL is put in a Teflon (registered trademark)-coated flask, and iron nitrate (III) 9 hydrate 0.00212 mol (858 mg), and gallium nitrate (III) 9 hydrate 0.0008465 mol (354 mg), are mixed thereinto, and are stirred sufficiently and dissolved at a room temperature. Further, CTAB 3.52 g, being a surfactant agent, is mixed and dissolved by stirring, to thereby obtain the micelle solution I.

At this time, the mixing composition in the micelle solution I is set, so that the molar ratio of Ga and Fe is Ga:Fe=x:(2−x), satisfying x=0.57.

(Preparation of the Micelle Solution II)

Ammonia aqueous solution 2 mL with concentration of 25% is mixed into pure water 4 mL and is stirred, to thereby obtain a solution. Further, n-octane 18.3 mL and 1-butanol 3.6 mL are added to this solution, and stirred sufficiently, to thereby obtain the solution, CTAB 3.52 g is added to this solution, and dissolved therein, to thereby obtain the micelle solution II.

[Procedure 2]

Thereafter, the same operation as that of the example 1 is performed, to thereby obtain the sample of comparative example 6.

In the same way as the example 1, the composition analysis was performed to the manufactured sample of the comparative example 6, and the result was shown in table 2.

Next, the constitutional ratio of the product in the sample of the comparative example 6 was calculated from the result of the composition analysis, and was shown in table 3.

Then, in the same way as the example 1, the evaluation of the particle properties was performed to the sample of the comparative example 6, and the evaluation result was shown in table 4.

Further, in the same way as the example 1, the measurement of the magnetic characteristics was performed to the sample of the comparative example 6, and the result of the evaluation of the magnetic characteristics was shown in table 4.

TABLE 1

| | Mixing composition | | | | | | |
|---|---|---|---|---|---|---|---|
| | | Quadrivalent element | Bivalent element | | | | Trivalent element |
| | Fe | Ti | Co | Ni | Mn | Zn | Al | Ga |
| Example 1 | 1.70 | 0.15 | 0.15 | | | | | |
| Example 2 | 1.80 | 0.10 | 0.10 | | | | | |
| Example 3 | 1.90 | 0.05 | | 0.05 | | | | |
| Example 4 | 1.70 | 0.15 | | | 0.15 | | | |
| Example 5 | 1.70 | 0.15 | | | | 0.15 | | |
| Example 6 | 1.80 | 0.10 | | | | 0.10 | | |
| Example 7 | 1.90 | 0.05 | | | | 0.05 | | |
| Example 8 | 1.40 | 0.10 | | | | | 0.50 | |
| Example 9 | 1.30 | 0.20 | | | | | 0.50 | |
| Example 10 | 1.40 | 0.05 | 0.05 | | | | 0.50 | |
| Example 11 | 1.60 | 0.05 | 0.05 | | | | 0.30 | |
| Example 12 | 1.40 | 0.15 | 0.15 | | | | 0.30 | |
| Example 13 | 1.65 | 0.03 | 0.03 | | | | 0.30 | |
| Example 14 | 1.50 | 0.15 | 0.15 | | | | 0.20 | |
| Example 15 | 1.60 | 0.15 | 0.15 | | | | 0.10 | |
| Example 16 | 1.40 | 0.05 | 0.05 | | | | | 0.50 |
| Example 17 | 1.60 | 0.05 | 0.05 | | | | | 0.30 |
| Example 18 | 1.40 | 0.15 | 0.15 | | | | | 0.30 |
| Example 19 | 1.70 | 0.10 | 0.10 | | | | | 0.20 |
| Example 20 | 1.80 | 0.05 | 0.05 | | | | | 0.10 |
| Example 21 | 1.40 | 0.05 | | 0.05 | | | 0.50 | |
| Example 22 | 1.40 | 0.15 | | 0.15 | | | 0.30 | |
| Example 23 | 1.40 | 0.05 | | | 0.05 | | 0.50 | |
| Example 24 | 1.20 | 0.15 | | | 0.15 | | 0.50 | |
| Example 25 | 1.60 | 0.05 | | | 0.05 | | 0.30 | |
| Example 26 | 1.40 | 0.15 | | | 0.15 | | 0.30 | |
| Example 27 | 1.40 | 0.05 | | | | 0.05 | 0.50 | |
| Example 28 | 1.40 | 0.15 | | | | 0.15 | 0.30 | |
| Example 29 | 1.60 | 0.05 | 0.05 | | | | | 0.30 |
| Example 30 | 1.50 | 0.10 | 0.10 | | | | | 0.30 |
| Example 31 | 1.40 | 0.15 | 0.15 | | | | | 0.30 |
| Comparative example 1 | 1.50 | 0.50 | | | | | | |
| Comparative example 2 | 1.70 | | 0.30 | | | | | |
| Comparative example 3 | 1.70 | | | 0.30 | | | | |
| Comparative example 4 | 1.70 | | | | 0.30 | | | |
| Comparative example 5 | 1.70 | | | | | 0.30 | | |
| Comparative example 6 | 1.70 | | | | | | | 0.50 |

TABLE 2

| | Analysis composition (mass %) | | | | | | | |
|---|---|---|---|---|---|---|---|---|
| | | Quadrivalent element | Bivalent element | | | | Trivalent element | |
| | Fe | Ti | Co | Ni | Mn | Zn | Al | Ga |
| Example 1 | 56.40 | 5.54 | 5.23 | | | | | |
| Example 2 | 57.70 | 3.15 | 3.41 | | | | | |
| Example 3 | 62.00 | 1.59 | | 1.50 | | | | |
| Example 4 | 56.00 | 4.70 | | | 4.86 | | | |
| Example 5 | 51.00 | 4.30 | | | | 5.12 | | |
| Example 6 | 53.00 | 2.80 | | | | 3.32 | | |
| Example 7 | 55.00 | 1.40 | | | | 1.65 | | |
| Example 8 | 46.60 | 2.77 | | | | | 9.07 | |
| Example 9 | 43.20 | 5.79 | | | | | 9.15 | |
| Example 10 | 46.50 | 1.49 | 1.66 | | | | 8.45 | |
| Example 11 | 55.80 | 1.69 | 1.81 | | | | 4.55 | |
| Example 12 | 45.40 | 4.93 | 5.13 | | | | 4.32 | |
| Example 13 | 55.00 | 0.77 | 0.88 | | | | 4.37 | |
| Example 14 | 49.00 | 4.90 | 5.15 | | | | 3.32 | |
| Example 15 | 53.00 | 4.90 | 5.15 | | | | 1.61 | |
| Example 16 | 39.00 | 1.50 | 1.59 | | | | | 19.40 |
| Example 17 | 51.30 | 1.62 | 1.57 | | | | | 11.60 |
| Example 18 | 44.40 | 4.66 | 4.94 | | | | | 11.70 |
| Example 19 | 65.00 | 1.50 | 1.64 | | | | | 8.11 |
| Example 20 | 57.00 | 1.60 | 1.62 | | | | | 3.97 |
| Example 21 | 47.30 | 1.70 | | 1.71 | | | 8.18 | |

TABLE 2-continued

| | Analysis composition (mass %) | | | | | | | |
|---|---|---|---|---|---|---|---|---|
| | Quadrivalent element | | Bivalent element | | | | Trivalent element | |
| | Fe | Ti | Co | Ni | Mn | Zn | Al | Ga |
| Example 22 | 45.60 | 4.83 | 4.94 | | | | 4.04 | |
| Example 23 | 50.00 | 1.70 | | | | 1.65 | 9.66 | |
| Example 24 | 14.00 | 1.20 | | | | 1.12 | 2.16 | |
| Example 25 | 57.00 | 1.70 | | | | 1.64 | 5.55 | |
| Example 26 | 51.00 | 5.10 | | | | 4.95 | 5.44 | |
| Example 27 | 47.00 | 1.60 | | | | 1.63 | 8.58 | |
| Example 28 | 44.50 | 4.70 | | | | 5.10 | 5.35 | |
| Example 29 | 51.30 | 1.62 | 1.57 | | | | | 11.60 |
| Example 30 | 47.00 | 3.28 | 3.25 | | | | | 11.50 |
| Example 31 | 44.40 | 4.66 | 4.94 | | | | | 11.70 |
| Comparative example 1 | 48.00 | 16.00 | | | | | | |
| Comparative example 2 | 53.50 | | 17.10 | | | | | |
| Comparative example 3 | 52.60 | | | 19.40 | | | | |
| Comparative example 4 | 54.70 | | | | 17.50 | | | |
| Comparative example 5 | 55.60 | | | | | 19.10 | | |
| Comparative example 6 | 52.60 | | | | | | 24.20 | |

TABLE 3

| | Product constitutional ratio | | | | | | | |
|---|---|---|---|---|---|---|---|---|
| | Quadrivalent element | | Bivalent element | | | | Trivalent element | |
| | Fe | Ti | Co | Ni | Mn | Zn | Al | Ga |
| Example 1 | 1.66 | 0.19 | 0.15 | | | | | |
| Example 2 | 1.79 | 0.11 | 0.10 | | | | | |
| Example 3 | 1.90 | 0.06 | | 0.05 | | | | |
| Example 4 | 1.68 | 0.17 | | | 0.15 | | | |
| Example 5 | 1.69 | 0.17 | | | | 0.13 | | |
| Example 6 | 1.79 | 0.11 | | | | 0.09 | | |
| Example 7 | 1.90 | 0.06 | | | | 0.05 | | |
| Example 8 | 1.36 | 0.09 | | | | | 0.46 | |
| Example 9 | 1.25 | 0.20 | | | | | 0.43 | |
| Example 10 | 1.38 | 0.05 | 0.05 | | | | 0.43 | |
| Example 11 | 1.62 | 0.06 | 0.05 | | | | 0.27 | |
| Example 12 | 1.40 | 0.18 | 0.15 | | | | 0.22 | |
| Example 13 | 1.67 | 0.03 | 0.03 | | | | 0.27 | |
| Example 14 | 1.47 | 0.17 | 0.15 | | | | 0.18 | |
| Example 15 | 1.58 | 0.17 | 0.15 | | | | 0.09 | |
| Example 16 | 1.35 | 0.06 | 0.05 | | | | | 0.38 |
| Example 17 | 1.60 | 0.06 | 0.05 | | | | | 0.27 |
| Example 18 | 1.39 | 0.17 | 0.15 | | | | | 0.23 |
| Example 19 | 1.74 | 0.05 | 0.04 | | | | | 0.20 |
| Example 20 | 1.79 | 0.06 | 0.05 | | | | | 0.10 |
| Example 21 | 1.39 | 0.06 | | 0.04 | | | | 0.42 |
| Example 22 | 1.42 | 0.18 | | 0.12 | | | 0.21 | |
| Example 23 | 1.36 | 0.05 | | | | 0.04 | 0.49 | |
| Example 24 | 1.33 | 0.13 | | | | 0.03 | 0.11 | |
| Example 25 | 1.58 | 0.05 | | | | 0.05 | 0.33 | |
| Example 26 | 1.39 | 0.16 | | | | 0.13 | 0.28 | |
| Example 27 | 1.38 | 0.05 | | | | 0.03 | 0.44 | |
| Example 28 | 1.36 | 0.17 | | | | 0.11 | 0.27 | |
| Example 29 | 1.60 | 0.06 | 0.05 | | | | | 0.27 |
| Example 30 | 1.49 | 0.12 | 0.10 | | | | | 0.25 |
| Example 31 | 1.39 | 0.17 | 0.15 | | | | | 0.23 |
| Comparative example 1 | 1.44 | 0.56 | | | | | | |
| Comparative example 2 | 1.54 | | 0.46 | | | | | |
| Comparative example 3 | 1.48 | | | 0.49 | | | | |
| Comparative example 4 | 1.51 | | | | 0.48 | | | |
| Comparative example 5 | 1.55 | | | | | 0.45 | | |
| Comparative example 6 | 1.46 | | | | | | | 0.51 |

TABLE 4

| | Particle properties | | | Magnetic characteristics | | | |
|---|---|---|---|---|---|---|---|
| | Average particle size (nm) | Standard deviation (nm) | Coefficient of variation (%) | Hc (Oe) | Hc (kA/m) | σs (Am²/kg) | σr (Am²/kg) |
| Example 1 | 18.34 | 9.70 | 52.88 | 1299 | 103.4 | 17.19 | 6.41 |
| Example 2 | 18.75 | 9.62 | 51.30 | 1306 | 103.9 | 15.99 | 6.29 |
| Example 3 | 17.14 | 8.43 | 49.18 | 862 | 68.6 | 5.43 | 1.04 |
| Example 4 | 25.24 | 11.19 | 44.35 | 1109 | 88.3 | 1.71 | 0.20 |
| Example 5 | 19.25 | 8.86 | 46.06 | 6053 | 481.7 | 5.45 | 2.22 |
| Example 6 | 20.62 | 9.41 | 45.64 | 4354 | 346.5 | 4.82 | 1.52 |
| Example 7 | 21.31 | 10.20 | 47.87 | 2527 | 201.1 | 4.14 | 0.93 |
| Example 8 | 20.26 | 8.67 | 42.79 | 5964 | 474.6 | 9.17 | 5.14 |
| Example 9 | 21.84 | 8.72 | 39.92 | 5398 | 429.6 | 6.26 | 3.26 |
| Example 10 | 18.69 | 7.17 | 38.36 | 2863 | 227.8 | 10.83 | 5.41 |
| Example 11 | 22.28 | 8.63 | 38.76 | 3491 | 277.8 | 14.24 | 7.72 |
| Example 12 | 25.48 | 10.37 | 40.71 | 2690 | 214.0 | 13.53 | 6.79 |
| Example 13 | 20.64 | 8.94 | 43.34 | 7191 | 572.3 | 12.57 | 7.53 |
| Example 14 | 20.14 | 8.85 | 43.92 | 2314 | 184.2 | 13.84 | 6.28 |
| Example 15 | 18.55 | 7.89 | 42.57 | 1838 | 146.3 | 15.07 | 6.20 |
| Example 16 | 19.59 | 8.10 | 41.33 | 712 | 56.7 | 14.29 | 4.84 |
| Example 17 | 19.30 | 8.20 | 42.70 | 2567 | 204.2 | 17.38 | 8.68 |
| Example 18 | 20.86 | 10.46 | 50.17 | 1644 | 130.8 | 19.52 | 8.39 |
| Example 19 | 21.88 | 9.27 | 42.36 | 4061 | 323.2 | 16.28 | 9.06 |

TABLE 4-continued

| | Particle properties | | | Magnetic characteristics | | | |
|---|---|---|---|---|---|---|---|
| | Average particle size (nm) | Standard deviation (nm) | Coefficient of variation (%) | Hc | | σs (Am²/kg) | σr (Am²/kg) |
| | | | | (Oe) | (kA/m) | | |
| Example 20 | 19.73 | 9.03 | 45.75 | 5235 | 416.6 | 13.38 | 7.71 |
| Example 21 | 18.30 | 8.68 | 47.41 | 5249 | 417.7 | 9.42 | 5.29 |
| Example 22 | 18.28 | 8.46 | 46.27 | 4082 | 324.8 | 10.17 | 5.01 |
| Example 23 | 24.10 | 9.54 | 39.58 | 6532 | 519.8 | 10.39 | 6.22 |
| Example 24 | 37.35 | 17.20 | 46.05 | 3247 | 258.4 | 7.97 | 4.05 |
| Example 25 | 21.46 | 9.17 | 42.75 | 7734 | 615.5 | 8.78 | 4.34 |
| Example 26 | 32.67 | 16.32 | 49.97 | 8252 | 656.7 | 8.81 | 4.97 |
| Example 27 | 19.25 | 7.75 | 40.24 | 5292 | 421.1 | 9.37 | 5.22 |
| Example 28 | 21.00 | 8.84 | 40.19 | 6179 | 491.7 | 9.18 | 5.32 |
| Example 29 | 19.26 | 8.23 | 42.71 | 2567 | 204.2 | 17.38 | 8.68 |
| Example 30 | 19.23 | 8.41 | 43.76 | 99 | 7.9 | 17.94 | 3.52 |
| Example 31 | 20.86 | 10.46 | 50.17 | 1644 | 130.8 | 19.52 | 8.39 |
| Comparative example 1 | 20.07 | 9.30 | 46.35 | 54 | 4.3 | 0.34 | 0.01 |
| Comparative example 2 | 10.40 | 3.65 | 35.08 | 291 | 23.2 | 64.04 | 11.86 |
| Comparative example 3 | 10.55 | 5.47 | 51.83 | 5 | 0.4 | 41.17 | 0.46 |
| Comparative example 4 | 14.40 | 6.29 | 43.70 | 3 | 0.2 | 60.99 | 0.77 |
| Comparative example 5 | 10.90 | 4.30 | 39.46 | 5 | 0.4 | 22.99 | 0.20 |
| Comparative example 6 | 17.90 | 8.11 | 45.38 | 3965 | 31.5.5 | 19.40 | −10.28 |

Conclusion of Examples 1-9, Examples 10-31, and Comparative Examples 1-6

The evaluation results regarding the examples 1 to 9 revealed the following.

It is found that the magnetic iron oxide particles, with $\epsilon\text{-}Fe_2O_3$ as the main phase, which is expressed by the general formula $\epsilon\text{-}A_xB_yFe_{2-x-y}O_3$ (wherein A and B are mutually different metals excluding Fe, satisfying 0<x, y<1), is the magnetic powder having a high heat stability.

Also, it is found that Hc of the magnetic iron oxide particle can be set in a range of at least 68 kA/m to 482 kA/m.

Further, saturation magnetization σs at 25° C. can be set in a range of at least 1.71 Am²/kg to 17.2 Am²/kg.

The evaluation results regarding the examples 10 to 31 reveal the following.

It is found that Hc of the magnetic iron oxide particle can be set in a range of at least 56 kA/m to 675 kA/m.

Further, the saturation magnetization at 25° C. can be set in a range of at least 7.9 Am²/kg to 19.6 Am²/kg.

Meanwhile, the evaluation results regarding the comparative examples 1 to 6 reveal the following.

In the particle lacking one of the element A and the element B from $\epsilon\text{-}Fe_2O_3$ expressed by the general formula $\epsilon\text{-}A_xB_yFe_{2-x-y}O_3$, and the particle lacking two elements of the element A, the element B, and the element C from $\epsilon\text{-}Fe_2O_3$ expressed by the general formula $\epsilon\text{-}A_xB_yC_zFe_{2-x-y-z}O_3$, it was confirmed from the evaluation by the X-ray diffraction, that the obtained substance was not formed into the $\epsilon\text{-}Fe_2O_3$ single phase particle, and various phases coexisted therein. Then, due to coexistence of the various phases, there is almost no phase that exhibits a giant coercive force, and therefore Hc of the obtained particle is within 23.2 kA/m at most.

Meanwhile, it was found that the saturation magnetization σs at 25° C. could be set within a range of at least 0.34 Am²/kg to 65 Am²/kg. However, it was also found that most of the samples showed high values of 23 Am²/kg or more.

Meanwhile, in the sample of the comparative example 6 expressed by $\epsilon\text{-}Ga_{0.51}Fe_{0.46}O_3$, Hc of the obtained particle shows 315.5 kA/m, but the saturation magnetization as at 25° C. is 19.4 Am²/kg and high. Therefore, it is found that this sample can be hardly used in the present technique.

As examples of $\epsilon\text{-}Fe_2O_3$ replacement with a single trivalent element of the conventional technique, the inventors of the present invention prepared each sample of the $\epsilon\text{-}Ga_{0.22}Fe_{1.78}O_3$ (reference example 1), $\epsilon\text{-}Ga_{0.43}Fe_{1.57}O_3$ (reference example 2), $\epsilon\text{-}Ga_{0.47}Fe_{1.53}O_3$ (reference example 3), $\epsilon\text{-}Ga_{0.62}Fe_{1.38}O_3$ (reference example 4), and $\epsilon\text{-}Ga_{0.97}Fe_{1.03}O_3$ (reference example 5), $\epsilon\text{-}Al_{0.21}Fe_{1.79}O_3$ (reference example 6), $\epsilon\text{-}Al_{0.34}Fe_{1.66}O_3$ (reference example 7)) $\epsilon\text{-}Al_{0.59}Fe_{1.41}O_3$ (reference example 8), $\epsilon\text{-}Al_{0.76}Fe_{1.24}O_3$ (reference example 9), and further $\epsilon\text{-}Fe_2O_3$ (reference example 10) for comparison, as samples related to the comparative examples 6.

A preparation method of the samples of these reference examples 1 to 10 was performed based on the example 1<B>.

Regarding the prepared samples of the reference examples 1 to 10, in the same way as the example 1, Hc and Tc were measured. The results are shown in table 5. Further, the table 5 also shows the values of Hc and Tc of the samples of the examples 1, 4, 11, 12, 29, 30, 31.

Figure 13:
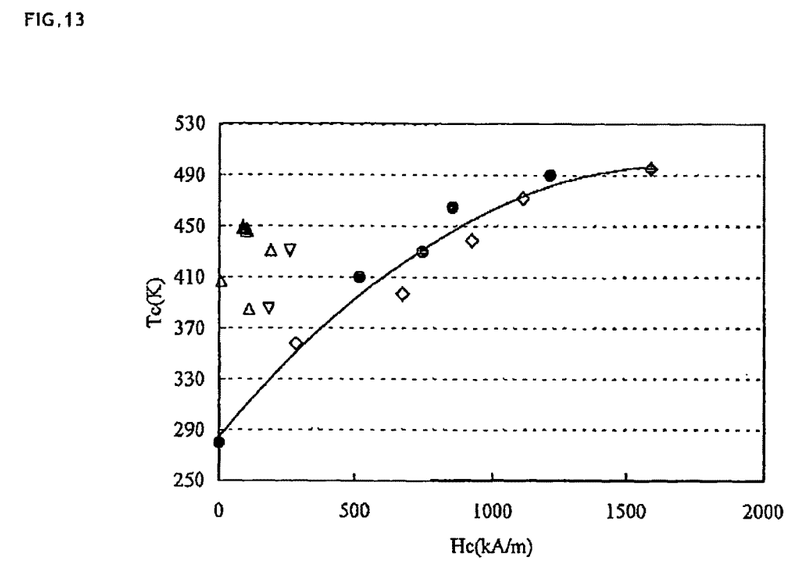
FIG. 13 is a graph showing a relation between Hc and Tc in the sample of the magnetic iron oxide according to examples 1, 4, 29 to 31, and reference examples 1 to 10.

Then, the data shown in the table 5 is plotted in a graph of FIG. 13, wherein Hc is taken on the horizontal axis and Tc is taken on the vertical axis. At this time, examples 1, 4 are plotted by ▲, examples 11, 12 are plotted by □ examples 29, 30, 31 are plotted by □ and reference examples 1 to 5 are plotted by ●, reference examples 6 to 9 are plotted by □ and reference example 10 is plotted by □.

Here, from FIG. 13 and table 3, it was found that the Curie point (Tc) was lowered to a room temperature or less when Hc was lowered to the present practical level, in the samples of the reference examples 1 to 5 wherein $\epsilon\text{-}Fe_2O_3$ is replaced only by Ga, and the samples of the reference examples 6 to 9 wherein $\epsilon\text{-}Fe_2O_3$ is replaced only by Al. Namely, in the sample wherein $\epsilon$-$Fe_2O_3$ is replaced only by Ga, it was found that the coercive force could be hardly reduced to the present practical level sufficient to allow the magnetic material to be utilized for the purpose of the use in the present magnetic recording medium.

Meanwhile, in the magnetic iron oxide particle of the present invention, the Curie point (Tc) can be maintained high, while having the coercive force Hc at the present practical level, and this revealed that it was the magnetic iron oxide particle capable of being utilized in the magnetic recording medium.

TABLE 5

| | | Hc | | Tc |
|---|---|---|---|---|
| | Composition formula | Oe | kA/m | K |
| Example 1 | $\epsilon$-$Ti_{0.19}Co_{0.15}Fe_{1.66}O_3$ | 1299 | 103 | 447 |
| Example 4 | $\epsilon$-$Ti_{0.17}Mn_{0.15}Fe_{1.68}O_3$ | 1109 | 88 | 449 |
| Example 11 | $\epsilon$-$Ti_{0.06}Co_{0.05}Al_{0.27}Fe_{1.62}O_3$ | 3500 | 279 | 428 |
| Example 12 | $\epsilon$-$Ti_{0.16}Co_{0.15}Al_{0.22}Fe_{1.40}O_3$ | 2500 | 199 | 384 |
| Example 29 | $\epsilon$-$Ti_{0.06}Co_{0.05}Ga_{0.27}Fe_{1.60}O_3$ | 2400 | 191 | 431 |
| Example 30 | $\epsilon$-$Ti_{0.12}Co_{0.10}Ga_{0.25}Fe_{1.49}O_3$ | 90 | 7 | 407 |
| Example 31 | $\epsilon$-$Ti_{0.17}Co_{0.15}Ga_{0.23}Fe_{1.60}O_3$ | 1400 | 111 | 385 |
| Reference example 1 | $\epsilon$-$Ga_{0.22}Fe_{1.78}O_3$ | 15300 | 1218 | 490 |
| Reference example 2 | $\epsilon$-$Ga_{0.43}Fe_{1.57}O_3$ | 10700 | 851 | 465 |
| Reference example 3 | $\epsilon$-$Ga_{0.47}Fe_{1.53}O_3$ | 9300 | 740 | 430 |
| Reference example 4 | $\epsilon$-$Ga_{0.62}Fe_{1.38}O_3$ | 6500 | 517 | 410 |
| Reference example 7 | $\epsilon$-$Ga_{0.80}Fe_{1.20}O_3$ | 1300 | 103 | 360 |
| Reference example 5 | $\epsilon$-$Ga_{0.97}Fe_{1.03}O_3$ | 0 | 0 | 280 |
| Reference example 6 | $\epsilon$-$Al_{0.21}Fe_{1.79}O_3$ | 14000 | 1114 | 472 |
| Reference example 7 | $\epsilon$-$Al_{0.34}Fe_{1.66}O_3$ | 11600 | 923 | 439 |
| Reference example 8 | $\epsilon$-$Al_{0.59}Fe_{1.41}O_3$ | 8400 | 668 | 397 |
| Reference example 9 | $\epsilon$-$Al_{0.76}Fe_{1.24}O_3$ | 3600 | 286 | 358 |
| Reference example 10 | $\epsilon$-$Fe_2O_3$ | 20000 | 1592 | 495 |

The invention claimed is:

1. A magnetic iron oxide particle, with $\epsilon$-$Fe_2O_3$ as a main phase, which is expressed by a general formula $\epsilon$-$A_xB_yFe_{2-x-y}O_3$, wherein the A element is a bivalent metal excluding Fe, the B element is a quadrivalent metal excluding Fe, and a relation expression $0<x, y<1$ is satisfied in the general formula.

2. The magnetic iron oxide particle according to claim 1, wherein the A element is one or more kinds of metals selected from the group consisting of Co, Ni, Mn, and Zn.

3. The magnetic iron oxide particle according to claim 1, wherein the B element is Ti.

4. The magnetic iron oxide particle according to claim 1, wherein a longest length of the magnetic iron oxide particle is 5 nm or more and 120 nm or less.

5. The magnetic iron oxide particle according to claim 1, wherein a coercive force Hc is 39.8 kA/m or more and 1194.3 kA/m or less.

6. The magnetic iron oxide particle according to claim 1, wherein saturation magnetization as σs at 25° C. is 0.1 $Am^2$/kg or more and 100 $Am^2$/kg or less.

7. A magnetic material containing the magnetic iron oxide particle of claim 1, and a binder.

8. A radio wave absorber, with the magnetic iron oxide particle of claim 1 dispersed in rubber or resin.

9. A magnetic iron oxide particle, with $\epsilon$-$Fe_2O_3$ as a main phase, which is expressed by a general formula $\epsilon$-$A_xB_yC_zFe_{2-x-y}O_3$, wherein the A element is a bivalent metal excluding Fe, the B element is a quadrivalent metal excluding Fe, the C element is a trivalent metal excluding Fe, and a relation expression $0<x, y, z<1$ is satisfied in the general formula.

10. The magnetic iron oxide particle according to claim 9, wherein the C element is one or more kinds of metals selected from the group consisting of In, Ga, and Al.

11. The magnetic iron oxide particle according to claim 9, wherein the A element is one or more kinds of metals selected from the group consisting of Co, Ni, Mn, and Zn.

12. The magnetic oxide particle according to claim 9, wherein the B element is Ti.

13. The magnetic iron oxide particle according to claim 9, wherein a longest length of the magnetic iron oxide particle is 5 nm or more and 120 nm or less.

14. The magnetic iron oxide particle according to claim 9, wherein a coercive force Hc is 39.8 kA/m or more and 1194.3 kA/m or less.

15. The magnetic iron oxide particle according to claim 9, wherein saturation magnetization as σs at 25° C. is 0.1 $Am^2$/kg or more and 100 $Am^2$/kg or less.

16. A magnetic material containing the magnetic iron oxide particle of claim 9, and a binder.

17. A radio wave absorber, with the magnetic iron oxide particle of claim 9 dispersed in rubber or resin.

* * * * *